United States Patent [19]

Aizawa et al.

[11] Patent Number: 5,297,927
[45] Date of Patent: Mar. 29, 1994

[54] VERTICAL SHAFT TYPE PUMP

[75] Inventors: Kooji Aizawa; Katsutoshi Nii, both of Hitachi; Ryoji Okada, Ibaraki; Masayuki Yamada, Tsuchiura; Kunio Takada, Ibaraki, all of Japan

[73] Assignee: Hitachi, Ltd., Tokyo, Japan

[21] Appl. No.: 10,079

[22] Filed: Jan. 28, 1993

[30] Foreign Application Priority Data

Jan. 29, 1992 [JP] Japan .................. 4-013688

[51] Int. Cl.⁵ .................. F01D 25/18
[52] U.S. Cl. .................. 415/110; 384/315; 384/321; 415/111
[58] Field of Search .............. 415/110, 111, 112, 113; 384/317, 321, 315, 316

[56] References Cited

U.S. PATENT DOCUMENTS

| | | | |
|---|---|---|---|
| 2,002,914 | 5/1935 | Mendenhall et al. | 415/111 |
| 3,850,550 | 11/1974 | Kaessen | 415/111 |
| 3,927,951 | 12/1975 | Mitsuhashi | 415/110 |
| 4,190,396 | 2/1980 | Tomioka et al. | 415/110 |

FOREIGN PATENT DOCUMENTS

| | | | |
|---|---|---|---|
| 6419 | 1/1984 | Japan | 384/316 |
| 76921 | 3/1990 | Japan | 384/316 |
| 2149454 | 6/1985 | United Kingdom | 415/110 |

OTHER PUBLICATIONS

Japanese Unexamined Publication No. 60-147597 with English language abstract.
Japanese Unexamined Publication No. 57-134014 with English language abstract.

*Primary Examiner*—John T. Kwon
*Attorney, Agent, or Firm*—Antonelli, Terry, Stout & Krauss

[57] ABSTRACT

A vertical shaft type pump including a bearing device in which water in the pump is utilized as lubricating water without supplying water to the bearing from the outside of the pump, thereby repeatedly conducting no-load operation in the air (in such a state that water is not pumped) stably for a long period of time. In the pump, a water storage tank upwardly opened is fixed to a rotary shaft, and the lubricating water (the water in the pump) is retained within the water storage tank so that the bearing is operated while being always soaked in the lubricating water. Also, foreign substances in the water storage tank are mixed with the water without deposition, and the water containing the foreign substances is replaced by the newly pumped water.

11 Claims, 6 Drawing Sheets

VERTICAL SHAFT TYPE PUMP

FIELD OF THE INVENTION

The present invention relates to a vertical shaft type pump adapted for draining rainwater or the like, and, more particularly, to a vertical shaft type pump which is adapted to carry out stand-by operations without supplying water from outside of the pump.

BACKGROUND OF THE INVENTION

Generally, the pump used for drainage of rainwater or the like is often a vertical shaft type pump, with a bearing for supporting the vertical shaft generally being a ceramic bearing having excellent wear resistance. In such a ceramic bearing pump water is used as a lubricant.

Due to rapid urbanization, a problem arises in that a large amount of rainwater abruptly flows into a drainage yard. To cope with this condition, it is necessary to provide for an operation of the pump following a standby operation. When a vertical shaft type pump, which, in a no load operation, pumps air during a stand-by operation, it is driven for a long period of time in such a state, water is not lifted, that is, no lubricating water exists in the pump, during rotation of the main shaft. During the operation, the main shaft rotates in the bearing in a completely dry state, which inevitably results in an abnormal wearing of the bearing. Thus, even a ceramic bearing cannot be employed in the vertical shaft type pump to conduct a no load operation.

As a measure for solving the above-described problem, Japanese Patent Unexamined Publication 2-115592 proposes a method wherein previously prepared lubricating water is supplied from the outside of a pump to a bearing during a previous stand-by operation. In this method, a full-water detector senses whether or not the bearing is soaked within the water and, where the bearing is not soaked within the water, the lubricating water is supplied from outside of the pump, and when the bearing is detected to be soaked in the water, the supply of water is stopped.

Japanese patent Unexamined publication 59-155621 proposes another arrangement wherein, in order to conduct a no-load operation with air for a short period of time, an oilimpregnated ceramic bearing is employed in which oil is previously impregnated and a small amount of oil delivered from the bearing due to thermal expansion lubricates a sliding surface.

Japanese Patent Unexamined Publication 55-90718 proposes a method in which a water storage tank is provided beforehand around a bearing and clean water is supplied into the water storage tank from the outside of the pump, prior to starting operation of the pump.

However, the lubricating structure disclosed in Japanese Patent Unexamined Publication 2-115592 has a disadvantage in that a large amount of water is required for lubrication, when the no-load operation of the pump is driven for a long period of time because the water is continuously fed to the bearing from the outside of the pump during the no-load operation. Also, since the above proposed structure includes a water-supplying pipe system, maintenance of the pipe system is naturally required. On the other hand, only a small amount of oil can be contained in the oil-impregnated ceramic bearing. During the operation of the pump over a long period of time, the temperature of the bearing is unfavorably increased so that it becomes impossible to continue the operation of the pump. Because the oil delivered from the bearing is not recycled, the oil is completely consumed from the bearing during the operation over a long term of years. As a result, the no-load operation may not repeatedly be conducted.

A similar arrangement to the method described in Japanese Patent Unexamined Publication 2-115592 has been proposed wherein a tank or a water storage tank is provided at a bearing portion for the purpose of lubricating the bearing, with the tank including a water-supplying pipe system, so that maintenance of the pipe system is required. When the pumped water is utilized as a lubricant, there is a possibility that sand and soil will deposit in the tank.

In the lubricating structure for the bearing as mentioned above, it is possible to repeatedly and stably conduct the no-load operation for a long period of time while utilizing the water in the pump (pumped water) as the lubricant without supplying lubricating water from outside the pump.

SUMMARY OF THE INVENTION

The present invention aims at providing a pump including a lubricating structure of a bearing which enables a previous stand-by operation to be conducted repeatedly and stably for a long period of time by utilizing the water in the pump as lubricating water without supplying lubricating water from outside the pump.

According to the invention, a vertical shaft type pump including a bearing within a passage for pumped water is provided with a rotatable lubricating water tank which receives the bearing within the pump water passage, and is also provided with an opening portion in communication with the pumped water passage, with the opening portion being formed at an upper portion of the lubricating water tank.

With a pump including a bearing device of the aforementioned type, since the bearing is always soaked in the lubricating water previously received in the water storage tank even though the lubricating water is not supplied from outside the pump, a stable sliding characteristic can be obtained. The lubricating water is surely supplied fully at the time of pumping the water. The lubricating water, once received in the tank, minimally evaporates because the humidity within the pump is high and therefore the water stays in the tank for a long period of time. For these reasons, it becomes quite unnecessary to supply the lubricating water from outside of the pump. Furthermore, since a water-supplying pipe system for lubrication is not needed, maintenance of the pump system is eliminated and there is no trouble in the water supply pipe system, so that a reliability of the overall pump is improved.

Accordingly, by virtue of the features of the present invention, a stable sliding characteristic can be obtained for a long period of time even in the case of the no-load operation (previous stand-by operation) during which pumped water does not come into the pump. More particularly, as compared with the oil-impregnated ceramic bearing, fine ceramics can be used so as to more enhance a reliability in the strength of the bearing.

As a more important matter, because the water storage tank rotates, foreign substances depositing on the bottom of the tank are mixed with the stored water by the centrifugal force resulting from the rotation of the tank so as to be discharged out of the water storage tank. The lubricating water including the foreign substances is replaced by newly pumped lubricating water. Thus, the foreign substances are not deposited in the water storage tank. As a result, a storage volume of the lubricating water does not fluctuate in a level and an amount of water around the bearing sliding surface is constant so that the bearing sliding surface is sufficiently lubricated to restrain the temperature of the bearing from being increased. Therefore, according to the invention, a highly reliable pump can be obtained.

DETAILED DESCRIPTION

Figure 1:
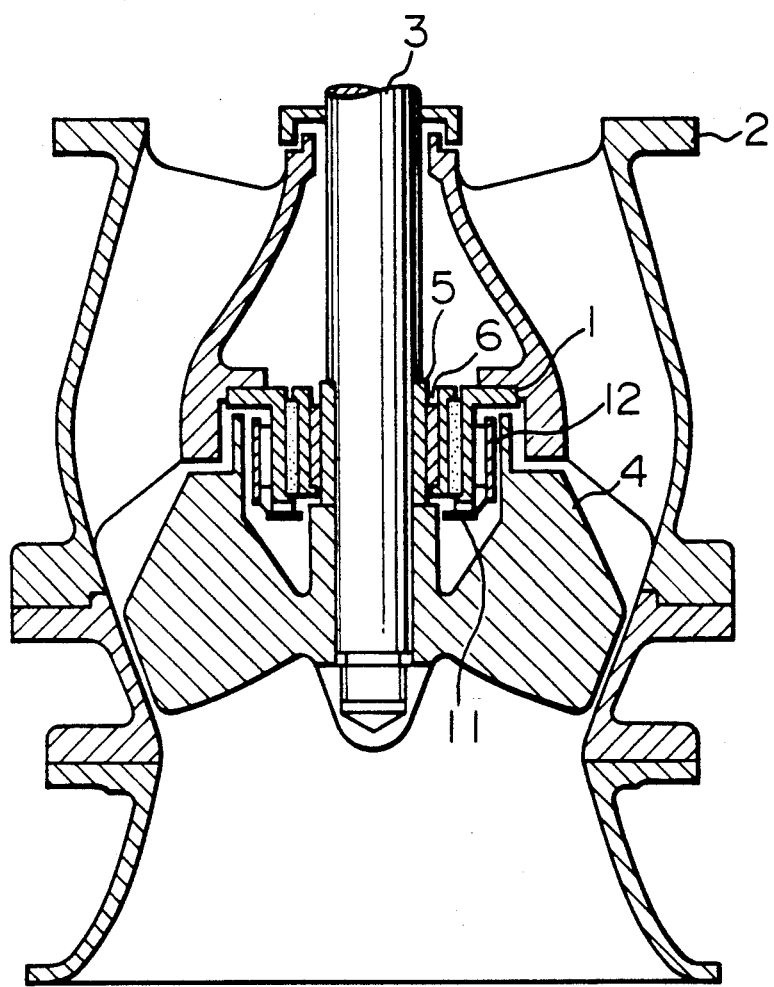
FIG. 1 is a vertical cross-sectional view of a portion of a pump according to the invention.

While the following description is given with respect to a pump in which a bearing is formed from ceramics, a can readily be appreciated, the material for the bearing is not restricted to ceramic. As shown in FIG. 1, a bearing device according to the invention is provided in a pump casing 2, with the ceramic bearing device 1 being attached to the pump casing 2, and with an impeller 4 being fixedly attached to a rotary shaft 3. The impeller 4 is suspended by the ceramic bearing device 1. As mentioned above, a vertical shaft pump which conducts a no-load operation with air represented by the previous stand-by operation, is driven for a long period of time in such a state that water is not pumped in spite of a rotation of the rotary shaft 3.

Figure 2:
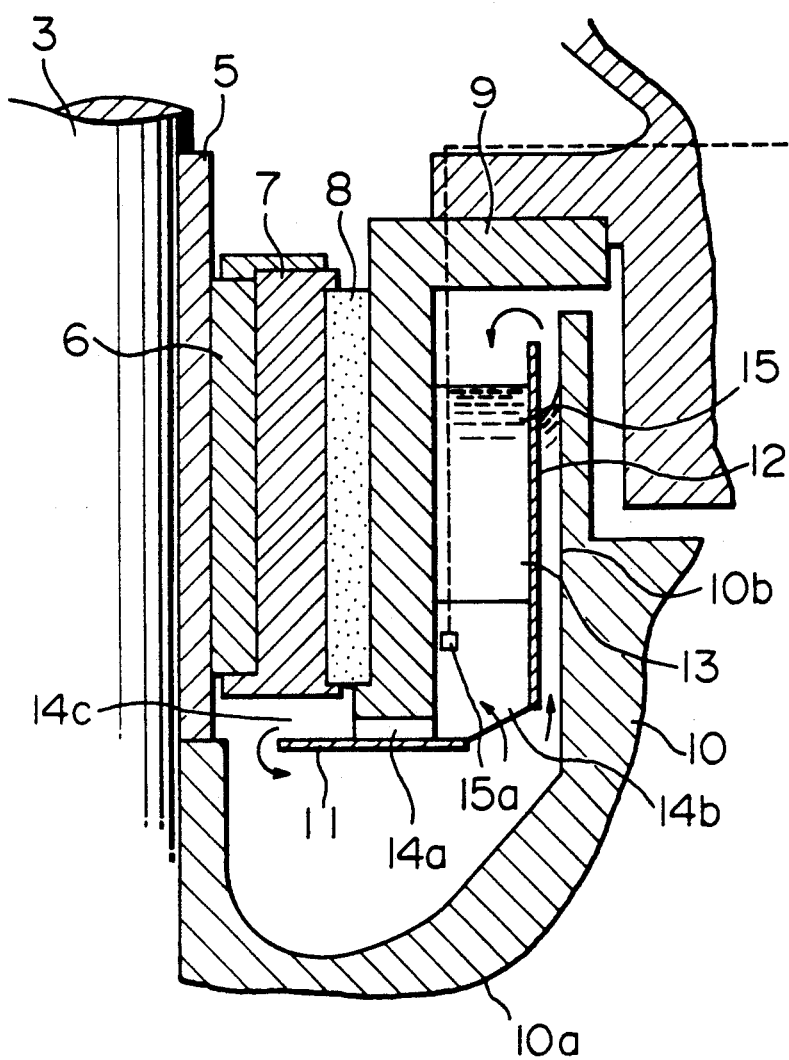
FIG. 2 is a vertical cross-sectional view of a bearing portion of the pump according to the invention.

In FIG. 2, the arrows in the figure indicate a direction of circulation of lubricating water during a rotation of the rotary shaft 3. The ceramic bearing device 1 includes the rotary shaft 3, a sleeve 5, made from or coated with a sintered hard alloy, attached on the rotary shaft 3, a ceramic bearing 6 for slidably supporting the sleeve 5, a bearing holder 7 in which the ceramic bearing 6 is retained, and a bearing casing 9 elastically connected to the bearing holder 7 through a resilient material 8. The ceramic bearing device also includes a water storage tank 10 provided on an outer peripheral side of the rotary shaft 3 so as to surround a lower end face of the bearing casing 9 and an outer peripheral side thereof. In this case, the water storage tank is formed by utilizing an upper portion of the impeller 4 fixedly attached to the rotary shaft 3 so as to rotate together with the rotary shaft 3. The lubricating water is previously poured into the water storage tank 10 after completion of setting and assembling of the pump. Thereafter, water is automatically supplied into the water storage tank by pumping the water when the pump is driven, so that the tank is always filled with water and it becomes unnecessary to supply water into the tank from an outside source.

In this connection, the rotary shaft 3 rotates in the ceramic bearing device I in such a manner that the ceramic bearing is always soaked in the lubricating water. Thus, a stable sliding characteristic can be obtained for a long period of time even with the no load operation in which water is not pumped. By virtue of the above described constructional features of the pump, it is unnecessary to supply lubricating water from outside of the pump. Naturally, a pipe system for supplying the water becomes useless, which reduces maintenance costs of the pipe system. Furthermore, since the water storage tank is secured to the rotary shaft 3, even if foreign substances which may be mixed in the rainwater enter the water storage tank, the foreign substances are mixed with the rotating water due to the rotation of the rotary shaft 3 and are replaced by the newly pumped lubricating water. In this manner, the foreign substances do not accumulate in the water storage tank. As a result, a level and an amount of the lubricating water hardly fluctuates and a water level at the bearing sliding surface is constant so that the bearing sliding surface is sufficiently lubricated. Accordingly, the temperature of the bearing is not raised, and therefore a ceramic bearing device 1 having a high reliability can be obtained.

In the illustrated embodiment, agitation means are provided for positively mixing the foreign substances in the water by a mutually potentiating effect obtained by a combination of the rotating flow of the water in the storage tank and the circulating flow of the water in the radial direction. Also, means 15a, for detecting a level of water, are provided for determining whether or not lubricating water exists in the water storage tank. Provision of the water level detecting means 15a further improves the reliability of the ceramic bearing device 1.

The agitating means includes a stationary baffle plate 11 and a fixed cylindrical member 12 which are respectively provided in opposition to a lower surface member 10a and an outer peripheral member 10b of the water storage tank 10 for rotation. The baffle plate 11 and the fixed cylindrical member 12 are retained by a plurality of ribs 13 attached on an outer peripheral surface of the bearing casing 9. Opening portions 14a, 14b are formed between the bearing casing 9 and the baffle plate 11 and between the baffle plate 11 and the fixed cylindrical member 12, respectively, through which opening portions 14a, 14b the lubricating water circulates. The agitating means acts to mix the foreign substances and also acts to retain, in a horizontal state, a surface of the lubricating water received in the water storage tank during rotation of the rotary shaft. As a result, the level of the lubricating water hardly fluctuates and the water level at the bearing sliding surface is constant. Consequently, the bearing sliding surface is sufficiently lubricated and the temperature of the bearing is not increased. According to the embodiment, the ceramic bearing device has a high reliability.

The provision to the baffle plate 11 imparts a rotational force to the lubricating water which has come into contact with the lower portion of the water storage tank due to the viscosity. The water flows in a rotating manner between the water storage tank 10 and the baffle plate 11 to generate a centrifugal force. Thereafter, the water is released from the opening portion 14b provided on the outer peripheral side of the bearing casing 9. Simultaneously, the water flowing toward the inner peripheral wall of the tank, due to the centrifugal force, is continuously supplemented with the water flowing from the opening portion 14c provided on the inner peripheral side of the bearing casing 9. For the above reasons, the water above and below the baffle plate 11 regularly circulates so that the foreign substances are favorable agitated and mixed within the water without deposition.

More specifically, in a bearing device without the baffle plate 11, neither the fixed cylindrical member 12, the ribs 13 nor the lubricating water 15 begins to rotate at a portion in contact with the water storage tank 10 as the tank 10 rotates, and all of the lubricating water rotates. The water level depicts a parabolic orbit so as to be apart from the portion of the ceramic bearing sliding surface.

Figure 3:
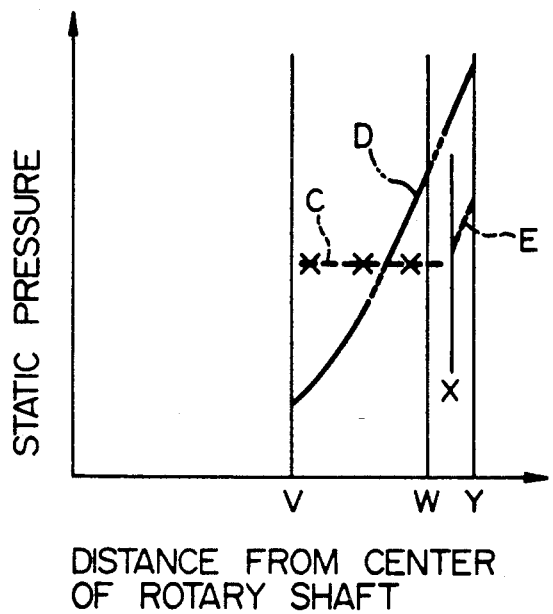
FIG. 3 is a graphical illustration of pressure of a bearing lubricating liquid in the invention.

However, when the baffle plate 11 is provided, a rotational force is imparted to the lubricating water in contact with the lower portion of the water storage tank 10 due to the viscosity. The water between the water storage tank 10 and the baffle plate 11 rotates to generate the centrifugal force, and it is released from the opening portion 14b provided on the outer peripheral side of the bearing casing. Simultaneously, the water flowing toward the inner peripheral wall of the tank, due to the centrifugal force, is continuously supplemented with the water flowing from the opening portion 14c provided on the inner peripheral side of the bearing casing 9, so that the water above and below the baffle plate 11 regularly circulates to maintain static pressure of the water substantially at a constant value. That is to say, the water below the baffle plate 11 is moved toward the inner peripheral wall of the water storage tank 10 so as to circulate through the opening portions 14a, 14b to the portion below the baffle plate 11. It has become clear from experimentation that the static pressure above and below the baffle plate 11 is distributed on a substantially same level, as shown in FIG. 3. A line C represents the distribution of the static pressure when the baffle plate 11 is provided, which distribution is remarkably stable as compared with the distribution of the static pressure, represented by line D, when the baffle plate 11 is not provided, as shown in FIG. 3. Marks x illustrate measurement points, with the reference characters V, W, X and Y representing positions on the inner side of the baffle plate 11, on the outer side of the baffle plate 11, on the outer side of the fixed cylindrical member 12 and on the inner side of the water storage tank 10. A line E represents distribution of the static pressure between the outer side of the fixed cylindrical member 12 and the inner side of the water storage tank 10. This means that a surface of the water above the baffle plate 11 is maintained generally horizontally. Meanwhile, an influence of the water rotating after contacting with the inner peripheral wall of the water storage tank 10 can be minimized by the provision of the fixed cylindrical member 12. More specifically, the water inside of the fixed cylindrical member 12 does not rotate at all, and the surface thereof can be maintained generally horizontally due to the function of the baffle plate 11. Because the water surface is kept substantially horizontally, the water is stably supplied to the bearing sliding surface. Although the water surface between the fixed cylindrical member 12 and the rotating water storage tank 10 depicts the parabolic orbit due to the rotation, a difference in height between the inner and outer portions of the water surface can be minimized by reducing a distance between the fixed cylindrical member 12 and the water storage tank 10. As a result, a displacement of the water surface inside of the fixed cylindrical member 12 can be minimized.

As mentioned above, according to the embodiment of the invention, the ceramic bearing device having a high reliability can be obtained, in which device, water is not supplied from outside of the pump.

In an oil-impregnated ceramic bearing or bearing device wherein water is supplied from outside of the pump without the water storage tank, since little oil or water exists on the bearing sliding surface, the ceramic bearing and sleeve are liable to directly come into contact with each other due to impact loads imposed on an impeller at an initiation of a pumping operation, which results in the possibility that the ceramic bearing and the sleeve will be damaged. According to the invention, unlike the oil-impregnated ceramic bearing or bearing device wherein water is supplied from outside of the pump, the bearing sliding surface of the present invention is always soaked in the lubricating water and a satisfactory water film exists on the bearing sliding surface. Accordingly, even when the impact load is imposed on the impeller at the initiation of the pumping operation, a large reaction force is generated due to a squeezing function so that the ceramic bearing and the sleeve hardly come into direct contact with each other and they are prevented from being damaged.

Furthermore, even if the pumped water rapidly flows into the pump immediately after initiation of the operation of the pump, the pumped water encounters obstacles of the lubricating water because the water storage tank 10 is filled with water, so that the velocity of the pumped water flowing into the water storage tank 10 is moderated. As a result, most of the foreign substances, entering through the pump water, flow upwardly in the pump without coming into the water storage tank 10. Therefore, the invention is effective in preventing entrance of the foreign substances.

On the other hand, when the pumping operation is completed and the pump is stopped, sand and soil particles contained in the pumped water remain on the bearing sliding surface and are dried thereon. Because it is difficult to completely remote the sand and soil particles adhering to the bearing sliding surface in the oil-impregnated ceramic bearing or bearing device wherein water supplied from the outside without the water storage tank, the ceramic bearing and the sleeve may be worn and damaged by the sand and soil particles during the no load operation.

According to the invention in which the water storage tank 10 is provided, however, the bearing sliding surface is washed by the lubricating water and the sand and soil particles are dispersed toward the inner peripheral wall of the water storage tank 10 due to the centrifugal force so as to be removed from the bearing sliding surface. Therefore, the bearing characteristic is stabilized for a long period of time because the ceramic bearing and the sleeve are hardly damaged by the sand and soil particles.

Figure 4:
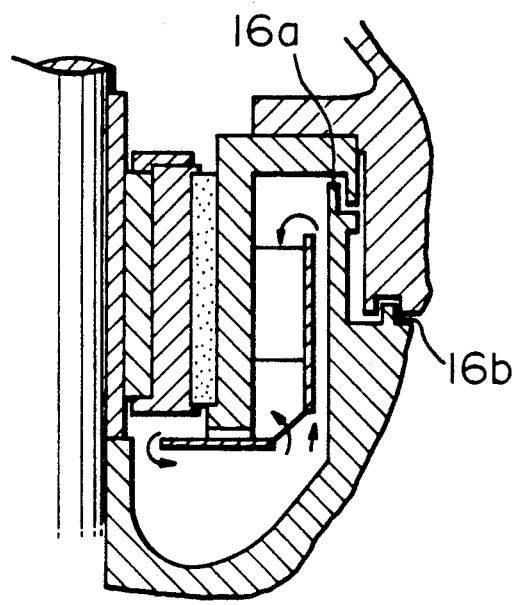
FIG. 4 is a vertical cross-sectional view of a bearing portion of a pump according to another embodiment of the invention.

In the embodiment of FIG. 4, for the purpose of effectively preventing entrance of foreign substances like rubbish into the water storage tank 10 when the pumped water flows into the water storage tank 10, sealing pieces 16a, 16b, for preventing entrance of the foreign substances, are additionally provided on the outside of the outer peripheral member of the water storage tank 10 it is needless to say that the above structure provides the effects and functions similar to those of the embodiment of FIGS. 1–3.

Figure 5:
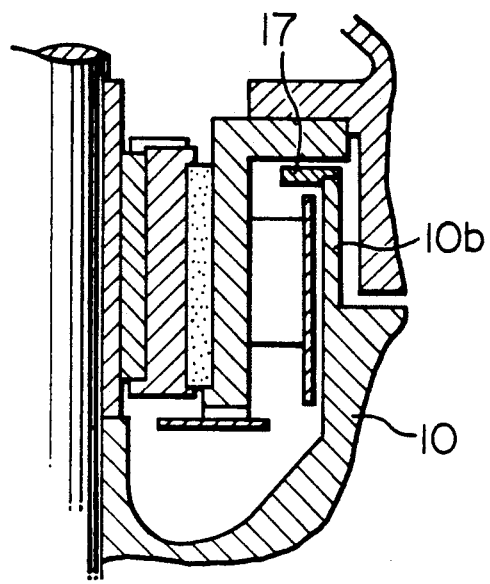
FIG. 5 is a vertical cross-sectional view of a bearing portion of a pump according to a further embodiment of the invention.

In the embodiment of FIG. 5, a plate 17 for preventing dispersion of lubricating water out of the water storage tank is attached to an upper portion of the outer peripheral member 10b of the water storage tank 10. With such a structure, an amount of lubricating water discharged from the water storage tank 10 can be reduced, which enables high-speed circulation of water to be achieved. Furthermore, the foreign substances contained in the pumped water are dispersed to the outside of the water storage tank 10 by the centrifugal force acting on the upper surface of the dispersion preventing plate 17. Therefore, the foreign substances scarcely enter the water storage tank 10.

Figure 6:
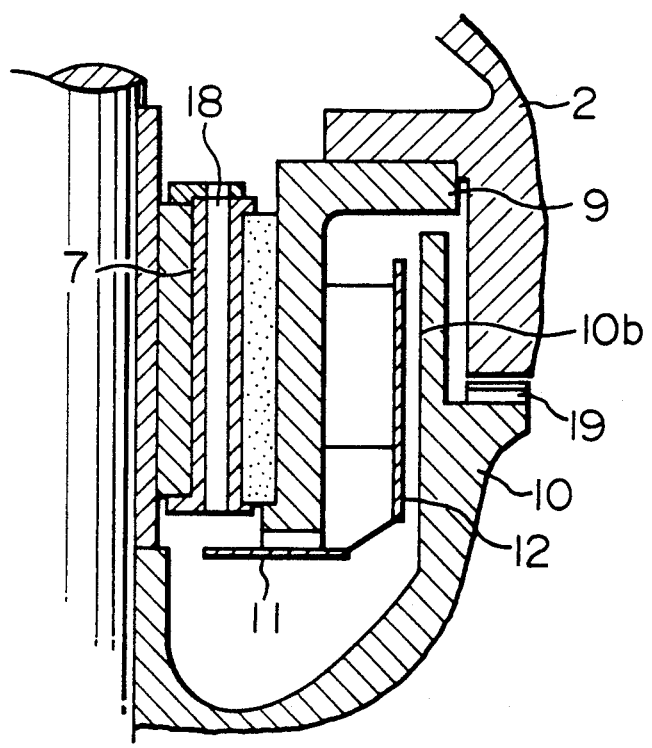
FIG. 6 is a vertical cross-sectional view of a bearing portion of a pump according to yet another embodiment of the invention.

In the embodiment of FIG. 6, the bearing holder 7 is provided with a plurality of through holes 18 and the outer peripheral member 10b of the water storage tank 10 is provided with centrifugal discharge means on its outer side. With such a construction, the water in the pump flows downwardly through the plurality of the through holes 18 provided on the bearing holder 7 during a pumping operation. Concurrently, the water is positively expelled from the water storage tank 10 by the centrifugal discharge means 19 provided on the outer side of the outer peripheral member 10b of the water storage tank 10. As a result, a continuous renewal of lubricating water in the water storage tank 10 is ensured during the pumping operation. Furthermore, since the water containing sand and soil particles hardly passes over the bearing sliding surfaces when renewing the lubricating water, the damage of the bearing and the sleeve by the sand and soil particles is reduced, so that a stable bearing function can be maintained for a long period of time. In addition, a sealing function of the centrifugal discharge means can be realized.

Figure 7:
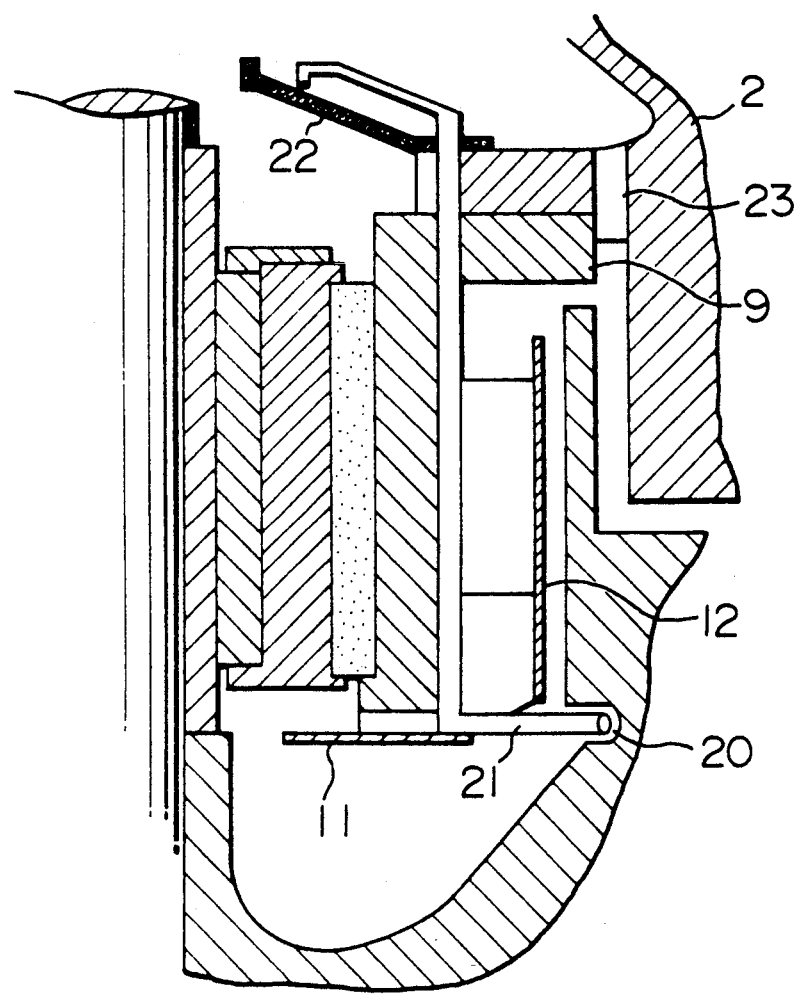
FIG. 7 is a vertical cross-sectional view of a bearing portion of a pump according to an additional embodiment of the present invention.

In the embodiment of FIG. 7, a circumferential groove 20 is formed on an inner side of the outer peripheral member 10b of the water storage tank 10, a lift pipe 21, fixed on the outer peripheral side of the bearing casing, is fitted in the groove 20, means 22 for separating sand and soil particles from the water is provided in a vicinity of an outlet of a lift pipe 21, and a plurality of holes 23 for discharging the sand and soil particles are provided in the vicinity of an outer periphery of the bearing casing. In this case, a screen is used as a separating means 22. With such a construction, when the water storage tank 10 rotates, the sand and soil particles contained in the lubricating water are collected within the circumferential groove 20 while being mixed due to a difference of the centrifugal force. The lubricating water, containing the sand and soil particles which have gathered, flows upwardly through the lift pipe 21 due to a pressure difference and drops down an upper surface of the screen so that the sand and soil particles are separated from the water. Subsequently, the sand and soil particles remaining on the upper surface of the screen roll over the screen toward the outer periphery of the bearing casing, so as to gather around the plurality of holes 23 for discharging sand and soil particles provided in the vicinity of the outer periphery of the bearing casing. The sand and soil particles drop down from the discharging holes 23, and are then dispersed outwardly in the radial direction of the pump by the centrifugal force of the water storage tank 10. Meanwhile, the lubricating water flows downwardly through the screen to return to the water storage tank 10. With such a construction, most of the sand and soil particles in the water storage tank 10 can be removed so that the damage of the bearing due to the erosion by sand within the storage tank 10 can be reduced. The embodiment of FIG. 7 is also effective when the lubricating water vaporizes and the amount of the water is decreased, because a quantity of the lubricating water is large.

Figure 8:
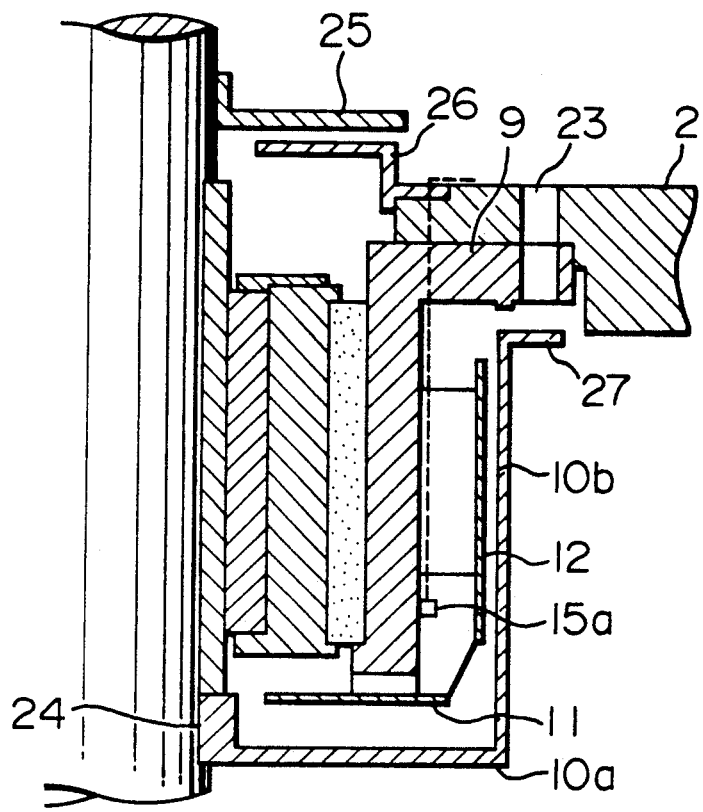
FIG. 8 is a vertical cross-sectional view of a bearing portion of a pump according to a still further embodiment of the invention.

The embodiment of FIG. 8 differs from the case where the upper portion of the impeller is utilized as the water storage tank, in that the water storage tank is replaced by a water tank 24 directly fixed to the rotary shaft, with a flinger 25 being provided on the rotary shaft in a vicinity of an upper end of the sleeve. A cover 26 is attached on an inner peripheral side of the pump casing, and a plurality of holes 23 are provided for discharging sand and soil particles, with the holes 23 being provided in a vicinity of an outer peripheral portion of the pump casing. It is needless to say that such structure provides functions and effects similar to the embodiment of FIG. 2.

With the embodiment of FIG. 8, even if the sand and soil particles enter a gap between the flinger 25 and the cover 26, they are dispersed outwardly due to centrifugal force of the flinger 25 fixedly attached on the rotary shaft above the upper end of the sleeve. The dispersed sand and soil particles accumulate on the outside of the cover and gradually drop down on an upper face 27 of a flange portion of the water tank directly connected to the rotary shaft through the plurality of holes 23 for discharging sand and soil particles provided in a vicinity of the outer peripheral portion of the bearing casing. Thereafter, the sand and soil particles are dispersed outwardly due to the centrifugal force and are removed. In this manner, because the sand and soil particles are restrained from entering into the water storage tank, the amount of the sand and soil particles within the water storage tank can be minimized and the damage due to erosion caused by sand within the water storage tank can be remarkably decreased. Also, since the lubricating water in the water storage tank hardly contains sand and soil particles, the amount of lubricating water is relatively large. Therefore, this embodiment is effective in the case where the vaporization of the lubricating water becomes such that the water is diminished.

Figure 9:
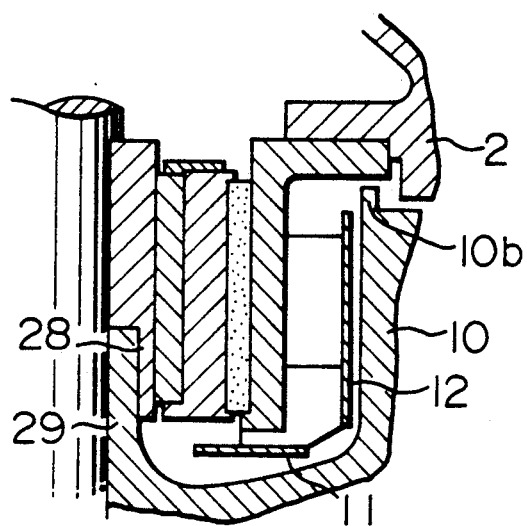
FIG. 9 is a vertical cross-sectional view of a bearing portion of a pump according to another embodiment of the invention.

In the embodiment of FIG. 9, a lower end portion 28 of the sleeve is fitted on an outer periphery of a boss 29 of the impeller, and the sleeve is designed to have an outer diameter larger than that of the boss 29. Naturally, such construction provides functions and effects similar to the embodiment of FIG. 2. Since the outer diameter of the sleeve is increased, the peripheral speed of the sliding surface becomes higher. As a result, a water film is preferably formed on the sliding surface so that the load resistance is improved. Moreover, a height of the outer peripheral member of the water storage tank can be decreased by a degree corresponding to a length of overlapping of the sleeve and the boss of the blade. Therefore, a vertical length of the bearing device is reduced, thereby making the pump compact.

In each of the above described embodiments, ceramics are used for the bearing; however, as is apparent, similar functions and effects can be obtained by utilizing highly hard material such as, for example, a sintered hard alloy or the like for the bearing and a member coated with a highly hard material for the sliding surface.

As mentioned above, according to the invention, the rotatable water storage tank receives the bearing therein. The tank includes the opening portions in communication with the pumped water passage. The tank is housed within the pumped water passage of the vertical shaft type pump. In this connection, the lubricating water supplied during the pumping operation is always retained in the water storage tank. At the time of the previous stand-by operation, the bearing is sufficiently lubricated by the lubricating water. It is unnecessary to supply the lubricating water from the outside of the pump or to provide a device for supplying the lubricating water from the outside of the pump as in the prior art. Since the tank for the lubricating water rotates, foreign substances such as sand and soil particles which have entered the lubricating water tank are expelled to the outside of the lubricating water tank due to the centrifugal force and the agitating function. As a result, foreign substances do not accumulate in the lubricating water tank, but the amount of water in the lubricating water tank can always be maintained at a constant volume. Therefore, according to the invention, it is possible to obtain a pump which can repeatedly and stably carry out stand by operation for a long period of time without supplying the water from outside of the pump.

What is claimed is:

1. A vertical shaft type pump including a bearing in a pumped water passage, wherein a rotatable lubricating water tank for receiving said bearing therein is provided within said pumped water passage, said water tank having an opening portion in communication with said pumped water passage.

2. A vertical shaft type pump including a bearing in a pumped water passage, wherein a rotatable lubricating water tank for receiving said bearing therein is provided around said bearing, said tank having an opening portion in communication with said pumped water passage and rotating with a rotary shaft.

3. A vertical shaft type pump including a bearing in a pumped water passage, wherein a rotatable lubricating water tank for receiving said bearing therein is provided within said pumped water passage, said pumped water passage enabling a flow of pumped water into and out of the water tank.

4. A vertical shaft type pump including a bearing in a pumped water passage, in which pumped water is utilized as a lubricant for the bearing, wherein a rotatable lubricating water tank for receiving said bearing therein is provided around said bearing, said pumped water passage enabling a flow of pumped water into and out of the water tank and wherein said tank is adapted to rotate with a rotary shaft.

5. A vertical shaft type pump including a bearing in a pumped water passage, in which pumped water is utilized as a lubricant for the bearing, wherein a lubricating water tank for receiving said bearing therein is provided within said pumped water passage, an opening portion, in communication with said pumped water passage, is provided at an upper portion on an outer peripheral side of said lubricating water tank, and wherein said lubricating water tank is adapted to rotate with the rotary shaft.

6. A vertical shaft type pump including a bearing in a pumped water passage, in which pumped water is utilized as a lubricant for the bearing, wherein a lubricating water tank is provided with said pumped water passage and surrounds said bearing, an opening portion, in communication with said pumped water passage, is provided at one portion of said lubricating water tank, and wherein said lubricating water tank is fixed to a rotary shaft.

7. A vertical shaft type pump according to claim 6, characterized in that said lubricating water tank is formed between said rotary shaft and an impeller for pumping.

8. A vertical shaft type pump according to claim 6, characterized in that an inner bottom portion of said lubricating water tank is formed to be sloped upwardly toward the outer peripheral side of the tank.

9. A vertical shaft type pump including a bearing in a pumped water passage, in which pumped water is utilized as a lubricant for the bearing, wherein a lubricating water tank is provided within said pumped water passage and surrounds said bearing, an opening portion in communication with said pumped water passage is provided at one portion of said lubricating water tank, said lubricating water tank is fixed to a rotary shaft, and wherein agitating means for stirring the lubricating water is provided within said lubricating water tank.

10. A vertical shaft type pump including a bearing in a pumped water passage, in which pumped water is utilized as a lubricant for the bearing, wherein a lubricating water tank is provided within said pumped water passage and surrounds said bearing, an opening portion in communication with said pumped water passage is provided at one portion of said lubricating water tank, said lubricating water tank is fixed to a rotary shaft, and wherein a fixed cylindrical member is provided between an inner surface of the peripheral wall of said lubricating water tank and said bearing in such a manner that said fixed cylindrical member is concentric with respect to said rotary shaft, a small gap is provided between a lower end edge of the cylindrical member and a bottom surface of said lubricating water tank.

11. A vertical shaft type pump according to claim 10, characterized in that longitudinally extending ribs are provided on an inner wall surface of said fixed cylindrical member.

* * * * *